United States Patent
Charlat et al.

(10) Patent No.: US 9,903,791 B2
(45) Date of Patent: Feb. 27, 2018

(54) SUPPORT AND ROTATION DEVICE FOR THE VISUAL INSPECTION OF A TIRE AND ASSOCIATED METHOD

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Julien Charlat, Clermont-Ferrand (FR); Christian Leobal, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 71 days.

(21) Appl. No.: 15/024,614

(22) PCT Filed: Sep. 24, 2014

(86) PCT No.: PCT/EP2014/070357
§ 371 (c)(1),
(2) Date: Mar. 24, 2016

(87) PCT Pub. No.: WO2015/044195
PCT Pub. Date: Apr. 2, 2015

(65) Prior Publication Data
US 2016/0231202 A1  Aug. 11, 2016

(30) Foreign Application Priority Data

Sep. 26, 2013 (FR) ...................................... 13 59265

(51) Int. Cl.
*G01M 17/02* (2006.01)

(52) U.S. Cl.
CPC ........ *G01M 17/022* (2013.01); *G01M 17/021* (2013.01); *G01M 17/027* (2013.01)

(58) Field of Classification Search
None
See application file for complete search history.

(56) References Cited

U.S. PATENT DOCUMENTS 4,936,138 A * 6/1990 Cushman ............ G01M 17/025
73/146
5,460,036 A * 10/1995 Church ................. B60C 25/142
254/50.3

(Continued)

FOREIGN PATENT DOCUMENTS

EP  1 808 686 A1  7/2007
EP  1 959 227 A2  8/2008

(Continued)

OTHER PUBLICATIONS

International Search Report dated Mar. 30, 2015, issued by WIPO in connection with International Application No. PCT/EP2014/070357.

*Primary Examiner* — Andre Allen
(74) *Attorney, Agent, or Firm* — Fitzpatrick, Cella, Harper & Scinto

(57) ABSTRACT

An inspection device for holding and turning a tire includes a centering structure which centers a first bead of the tire, a locking structure which locks the first bead in a centered position, a rotational driver which turns the tire about a tire axis, and at least one centering gripper module which interacts with a second bead of the tire. Each centering gripper module is provided with an internal spacing roller, an external holding roller, and a centering roller. The internal spacing roller is able to press axially against an internal face of the second bead. The external holding roller is able to bear axially against an external face of the second bead opposite (Continued)

the internal face. The centering roller is able to bear radially against the second bead and extends substantially axially. The internal spacing roller and the external holding roller extend substantially radially.

15 Claims, 3 Drawing Sheets

(56) References Cited

U.S. PATENT DOCUMENTS

| | | | | |
|---|---|---|---|---|
| 6,269,689 | B1* | 8/2001 | Alexander | G01M 17/025 |
| | | | | 73/146 |
| 6,840,097 | B1* | 1/2005 | Huber | G01B 11/30 |
| | | | | 356/237.1 |
| 7,568,385 | B2 | 8/2009 | Maehner et al. | 73/146 |
| 9,288,447 | B2 | 3/2016 | Leobal et al. | |
| 2007/0084275 | A1* | 4/2007 | Gotou | G01M 17/021 |
| | | | | 73/146 |
| 2008/0066532 | A1 | 3/2008 | Shaw et al. | 73/146 |
| 2013/0128029 | A1* | 5/2013 | Leobal | G01M 17/021 |
| | | | | 348/128 |
| 2013/0340515 | A1* | 12/2013 | Steinbichler | G01M 17/027 |
| | | | | 73/146 |
| 2014/0270466 | A1* | 9/2014 | Dam | G01M 17/027 |
| | | | | 382/141 |
| 2014/0373614 | A1* | 12/2014 | Steinbichler | G01M 17/027 |
| | | | | 73/146 |
| 2016/0225128 | A1* | 8/2016 | Krolczyk | G01N 21/952 |

FOREIGN PATENT DOCUMENTS

| | | |
|---|---|---|
| EP | 2 023 078 A1 | 2/2009 |
| EP | 2 172 737 A1 | 4/2010 |
| FR | 2 754 896 A | 4/1998 |
| FR | 2 957 417 A1 | 9/2011 |
| WO | WO 2011/113711 A1 | 9/2011 |

* cited by examiner

SUPPORT AND ROTATION DEVICE FOR THE VISUAL INSPECTION OF A TIRE AND ASSOCIATED METHOD

FIELD OF THE INVENTION

The present invention relates to the field of the visual inspection of tires.

BACKGROUND

More particularly, the invention relates to the devices used for holding and turning the tires so that the operations of visually inspecting the surfaces thereof can be carried out.

Visual inspection is widely used in the tire manufacturing process and even more commonly relies on the skill of the operators tasked with checking for the absence of visible imperfections at the surface of the tires in order to ensure compliance thereof.

However, with the advances in the computing power of computer-based means, tire manufacturers are developing automatic inspection means to assist the operators tasked with the visual inspection. To this end, it is possible to use an inspection device comprising lighting means and cameras which are positioned in such a way as to scan the exterior and interior zones of the lateral beads and of the tread of the tire that is to be inspected. The viewing field of each camera is angularly limited. In order to obtain complete images of the inside and outside of the tire the tire has to be turned about its axis with respect to the lighting means and with respect to the cameras. The digital images obtained are then processed and compared against reference images in order to determine whether there might be any surface and appearance anomalies in the tire. For further details, reference may for example be made to patent applications EP-A2-1 959 227, EP-A1-2 023 078 and EP-A1-2 172 737.

In order to carry out such an inspection, it is appropriate to use a device that holds the tire accurately as it is being turned. Document U.S.2008/0066532 discloses a drive device comprising a plurality of pairs of hooks which press against the internal faces of the lateral beads of the tire so as to space them from one another. The hooks are able to move between an engaged position for holding and turning the tire and a folded position for allowing the tire to be introduced and removed.

That device has the major disadvantage of not allowing images to be taken of the internal faces of the lateral beads of the tire in the zones against which the hooks bear. Thus, these hidden zones cannot be inspected without having first angularly repositioned the tire with respect to the hooks.

In order to overcome this disadvantage, the applicants have developed a holding and turning system comprising a centring ring for centring a first lateral bead of the tire, locking hooks for locking the said bead to the ring, two interior holding rollers mounted to press against the internal face of the second lateral bead of the tire, and an external holding roller pressing against the external face of the second bead situated circumferentially between the interior holding rollers. For further details, reference may be made to patent application WO-A1-2011/113711.

The use of the internal and external holding rollers allows an interior image of the tire to be captured with high geometric precision. In order to minimize the movements of the second lateral bead of the tire during the image-capture operation, the system also comprises lift rollers mounted to press against the internal face of the second bead so as to turn the said bead up axially in a circumferential segment that complements the segment occupied by the internal and external holding rollers.

Such an axial turning-up of the second bead towards the outside does, however, prevent an external image of the tire from being captured simultaneously in so far as the bead and the associated side wall are too deformed.

It is thus necessary to provide an additional special-purpose holding system able to hold the tire in the inflated state in order to obtain an exterior image of the tire with good geometric precision. This appreciably increases the cycle time required for visually inspecting the tire and the associated cost.

BRIEF DESCRIPTION OF THE INVENTION

The present invention seeks to overcome these disadvantages.

More specifically, the present invention seeks to provide a device for holding and turning a tire that is suited to being able to acquire an image of the inside and of the outside of the tire simultaneously.

The present invention also seeks to provide a device that allows centring, holding and turning to be performed in a stable, precise and repeatable manner.

In one embodiment, the device is intended for holding and turning a tire of the type comprising a tread and first and second lateral beads. The device comprises centring means able to allow the first lateral bead of the tire to be centred, locking means able to lock the said bead in the centred position, and drive means able to turn the tire about its axis, and at least one gripping and centring module for the second lateral bead of the tire. The said module is provided with at least one internal spacing roller able to press axially against the internal face of the second lateral bead, with at least one external holding roller able to come to bear axially against the opposite external face of the said second bead, the said spacing and holding rollers extending substantially radially, and with at least one centring roller able to come to bear radially against the said second lateral bead and extending substantially axially.

By virtue of the device it is possible to space and axially hold the bead associated with the rollers while at the same time ensuring that the said bead is correctly radially centred. Radial centring is obtained through the presence of the centring roller or rollers. Furthermore, the presence of such (a) centring roller(s) means that the bead of the tire can be held radially in a slightly axially spaced and closed stable position. There is therefore no need to plan to turn the bead up axially as was the case in the prior art in order to hold and turn in a stable, precise and repeatable manner.

With the device, it thus becomes possible to hold the tire in a position in which its profile approximates to that obtained in the inflated state. That means that an image of the inside and of the outside of the tire can be captured simultaneously at a single workstation.

For preference, the said gripping and centring module comprises at least two centring rollers which may be arranged circumferentially on each side of the internal spacing roller.

Advantageously, the centring roller or rollers are able to come to bear radially against the bore of the second lateral bead of the tire. The centring roller or rollers may be cylindrical.

For preference, the internal spacing roller of the said module is capable of axial translational movement with respect to the external holding and centring rollers. The said gripping and centring module may comprise a mounting base on which the external holding and centring rollers are mounted and a rod slidably mounted on the said base and supporting the internal spacing roller.

In one embodiment, the gripping and centring module comprises at least two external holding rollers. For preference, the external holding rollers are positioned circumferentially on each side of the internal spacing roller. The internal spacing roller may be positioned substantially in the middle of an angular sector delimited by the two external holding rollers. The said holding and centring module may comprise a single internal spacing roller.

The device may further comprise a fixed plate on which the said gripping and centring module is mounted with radial translational mobility.

In one preferred embodiment, the device comprises a plurality of mutually identical gripping and centring modules for the second lateral bead of the tire which may advantageously be spaced apart uniformly in the circumferential direction.

In one preferred embodiment, the centring means for centring the first lateral bead of the tire comprise a ring and the locking means comprise retractable hooks mounted on the said ring.

The invention also relates to a method for inspecting a tire of the type comprising a tread and first and second lateral beads using a device as defined hereinabove, comprising the steps during which:
- the first lateral bead of the tire is centred and locked on the centring means,
- a relative axial movement between the tire and the internal spacing roller is brought about in order to position the said roller axially at a different height from that of the internal face of the second lateral bead of the tire while being situated in the interior space of the tire,
- the gripping and centring module is deployed radially to bring the centring roller to a dimension smaller than the seat of the tire,
- the tire turning drive is actuated,
- a relative axial movement between the tire and the internal spacing roller is brought about in order to pinch the second lateral bead of the tire axially between the internal spacing and external holding rollers,
- the gripping and centring module is deployed radially in order to bring the centring roller radially to bear against the second lateral bead at a dimension corresponding to the seat of the tire, and
- internal and external image capture means are positioned to capture images of angular regions of the internal and external surfaces of the tire.

BRIEF DESCRIPTION OF THE DRAWINGS

The present invention will be better understood from reading the detailed description of one embodiment considered by way of entirely nonlimiting example and illustrated by the attached drawings in which.

DETAILED DESCRIPTION OF EMBODIMENTS OF THE INVENTION

Figure 1:
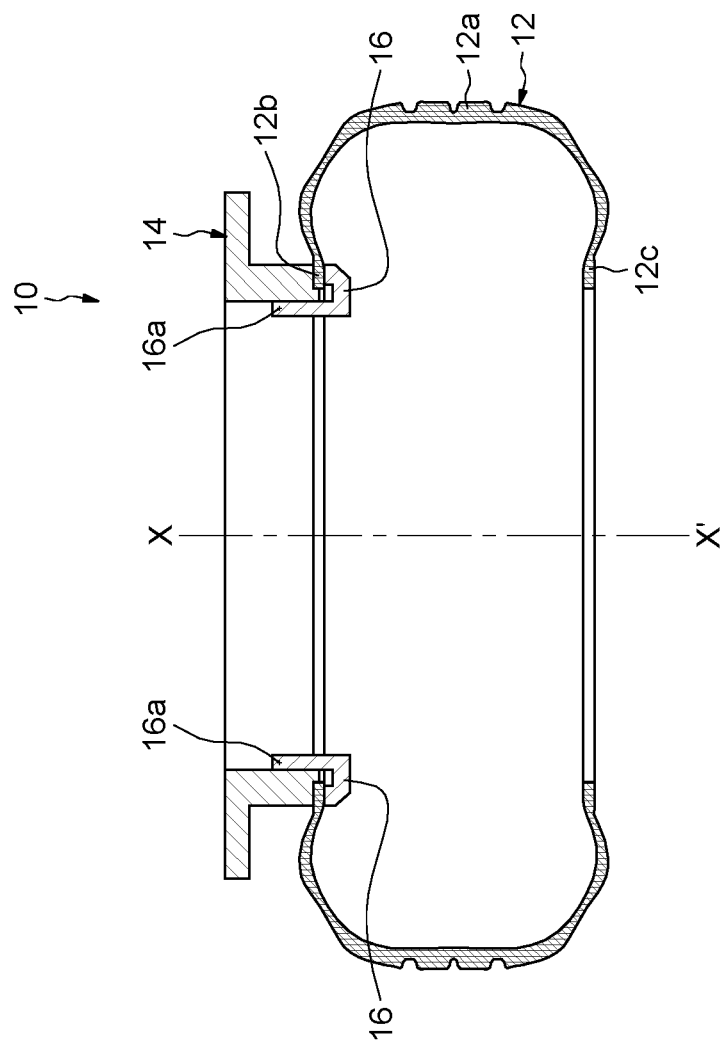
FIG. 1 is a schematic view in cross section of the upper part of a tire holding and turning device according to one embodiment of the invention.
Figure 2:
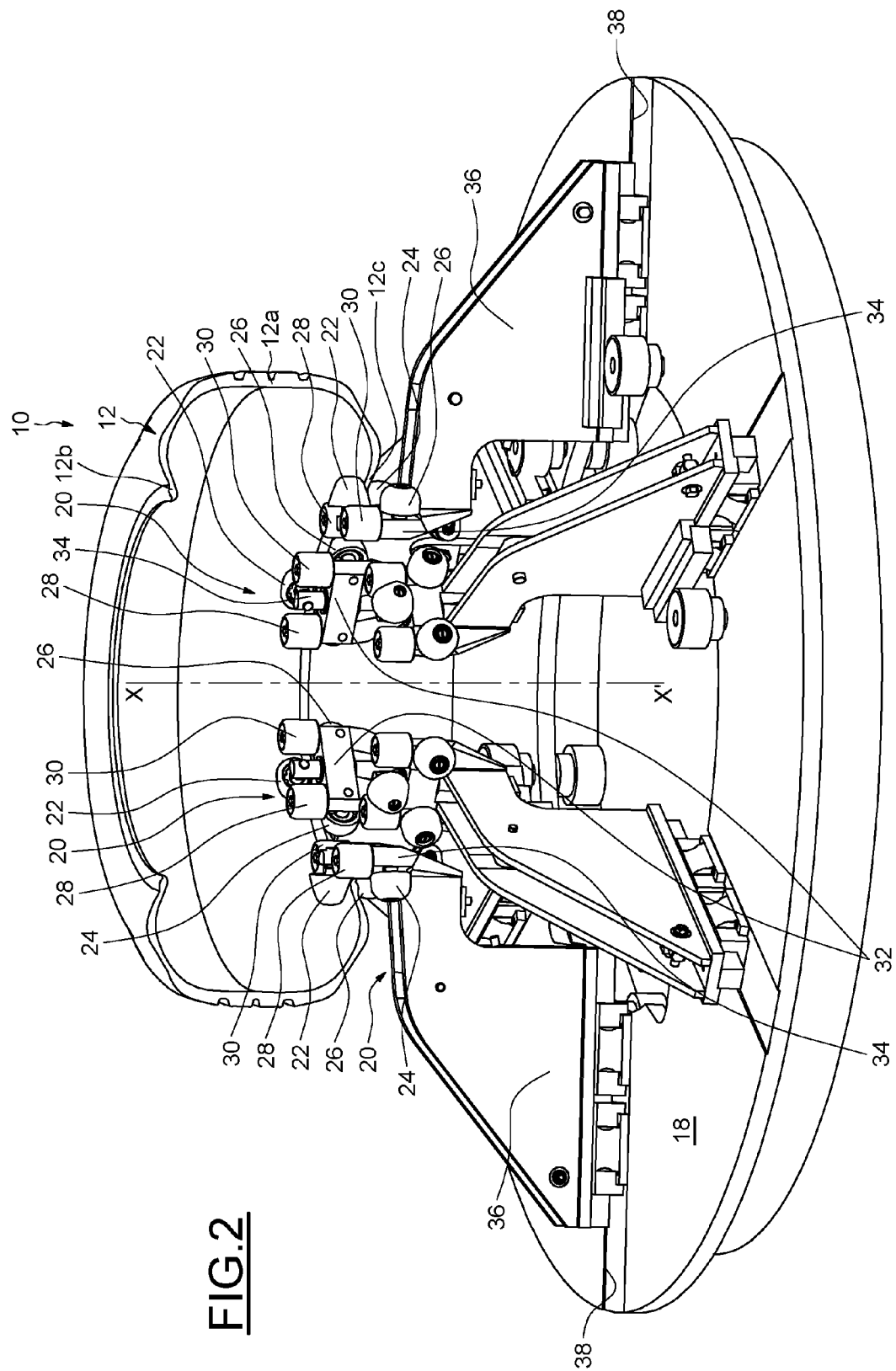
FIG. 2 is a partial perspective view of the lower part of the device of FIG. 1.
Figure 3:
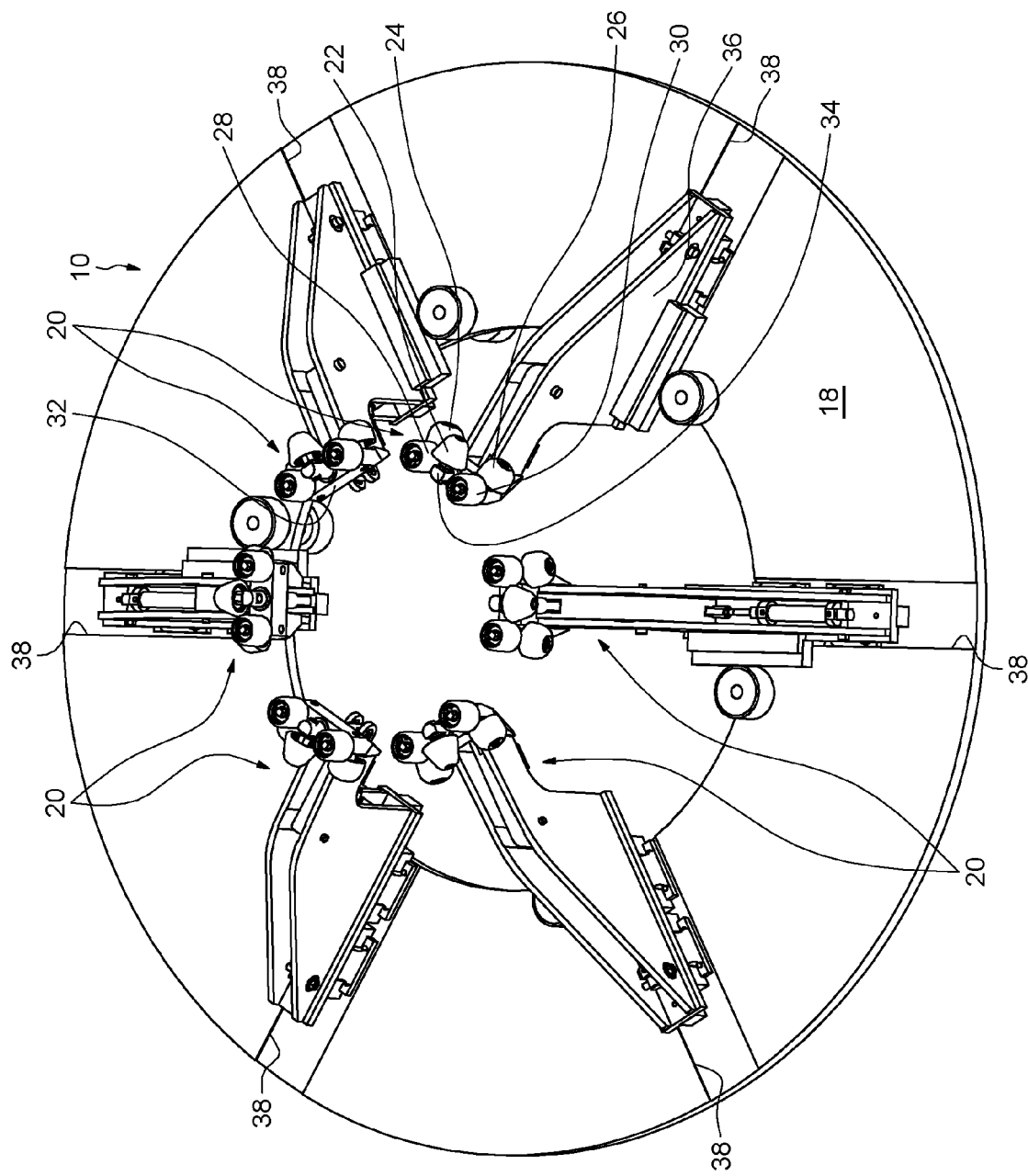
FIG. 3 is a perspective view of the lower part of the device of FIG. 1.

FIGS. 1 to 3 depict one exemplary embodiment of a device, referenced 10 overall, intended for holding and turning a tire 12. In the exemplary embodiment illustrated, the tire 12 is turned about its axis X-X' in a position of said axis assumed to be vertical. The tire 12, of annular shape, comprises a cylindrical tread 12a extended by first and second opposite side walls each comprising a lateral bead 12b, 12c.

The device 10 comprises a centring ring 14 on which the first lateral bead 12b of the tire is mounted, hooks 16 for locking the said bead onto the ring, and a fixed plate 18 supporting a plurality of gripping and centring modules 20 for the second lateral bead 12c of the tire.

As illustrated in FIG. 1, the centring ring 14, which is coaxial with the axis X-X' of the tire, is of annular overall shape suited to accepting the first lateral bead 12b of the tire. The centring ring 14 is connected to a framework (not depicted) by rolling bearings so that it can be turned about the axis X-X' by a motorized pinion in mesh with a rack (neither of which has been depicted) provided at the periphery of the ring.

The hooks 16 are distributed in the bore of the centring ring 14 and are each pivot mounted on the said ring about an axis 16a between an unlocked position that allows the tire to be fitted or removed and a locked position in which they press axially against the internal face of the first lateral bead 12b in order to hold it axially against the ring. In the locked position, the first lateral bead 12b is pinched axially between the hooks 16 and the centring ring 14. In the unlocked position, the hooks 16 are pivoted radially inwards towards the axis X-X'. For further details on the design and dynamics of the ring 14 and of the hooks 16, reference may be made to patent application WO-A1-2011/113711.

When the first bead 12b is centred and locked on the ring 14, the tire 12 is turned about the axis X-X' by actuation of the motorized pinion acting on the rack of the ring. The motorized pinion and the rack form rotational-drive means. Given that the first bead 12b of the tire is being held axially against the centring ring 14 by the hooks 16, the axis X-X' of the said tire remains coincident with the axis of the ring whatever the axial and radial movements performed on the second bead 12c by the gripping and centring modules 20.

As illustrated in FIGS. 2 and 3, the gripping and centring modules 20 are identical to one another and positioned on the plate 18 with a uniform circumferential spacing. In this instance the modules 20 are six in number. The plate 18 is of annular shape and is fixed to a table (not depicted).

In the embodiment illustrated, each module 20 comprises an internal spreading or spacing roller 22, two external holding rollers 24, 26 and two centring rollers 28, 30 each intended to collaborate with the second lateral bead 12c of the tire. Each module 20 is also provided with a common mounting base 32 on which the external holding and centring rollers 24 to 30 are mounted fixed in terms of translation, a rod 34 mounted with the ability to slide on the said base in the axial direction and supporting the internal spacing roller 22, and a frame 36 on which the base 32 is fixed. A set of link rods (which are not visible) is mounted on the frame 36 to allow axial movement of the rod 34. The roller 22 is able to move axially between a position close to the rollers 24 to 30 and a remote or deployed position.

The internal spacing roller 22 and the external holding rollers 24, 26 each extend along an axis oriented radially and are mounted with the freedom to rotate about their respective axes. The roller 22 extending radially is designed to come to bear axially against the internal face of the second lateral bead 12c of the tire. The rollers 24, 26 extending radially are intended to come to bear axially against the second lateral bead 12c of the tire axially on the opposite side to the roller 22. The rollers 24, 26 are firmly pressed axially against the external face of the second bead 12c. The rollers 24, 26 are axially offset towards the plate 18, namely in this instance downwards, with respect to the roller 22 and are positioned circumferentially on each side of the said roller. The roller 22 is positioned substantially in the middle of the angular segment delimited by the two rollers 24, 26. What is meant by "angular segment" is the angle formed by the radii passing through the axis X-X' of the tire and connecting the axes of the rollers 24, 26. The axis of the roller 22 is positioned substantially in the radial plane that passes through the bisector of the angular segment.

In the exemplary embodiment illustrated, the internal spacing roller 22 has a frustoconical exterior surface the vertex of which is directed radially outwards. This encourages the spacing and axial holding of the second bead 12c of the tire without causing damage. External holding rollers 24, 26 have a rounded exterior surface.

The centring rollers 28, 30 each extend along an axis oriented axially and are mounted with the freedom to rotate about their respective axes. The rollers 28, 30 have a cylindrical exterior surface and are designed to come to bear radially against the bore of the second lateral bead 12c of the tire. The axial exterior surface of each roller 28, 30 forms a radial abutment surface for the bead 12c. The rollers 28, 30 extending axially are positioned circumferentially on each side of the roller 22. The rollers 24 and 28, and 26 and 30, respectively, situated on one and the same side of the roller 22 are situated in one and the same radial plane passing through the axis X-X'.

The frame 36 supporting each module 20 is mounted with the capability of radial translational movement on the plate 18. For that, a plurality of slots 38 is formed on the face of the plate 18 that faces towards the tire 12 so as to allow the frames to slide. This sliding may be brought about by any appropriate means, for example by a rack or by cylinder actuators. For each gripping and centring module 20, the rollers 22 to 30 are able to move jointly in the radial direction between a folded or a retracted position in which they are situated so as to allow the tire 12 to be fitted or removed, and a radially outwards deployed position in which they come into contact with the second bead 12c of the tire. Furthermore, the roller 22 is capable of axial movement relative to the other rollers 24 to 30 of the module 20 through the sliding of the rod 34.

As will be described later on, the device 10 also comprises internal and external image capture means (not depicted) for visually inspecting the tire 12. Each capture means may comprise a lighting device of the laser or slot light type forming a plane of light and of which the intersection with the tire 12 forms a line, and one or more cameras, for example matrix cameras, able to capture the light reflected off the tire 12. The internal and external image capture means may for example each be three in number.

In order to inspect the tire 12 using the device 10 the procedure is as follows. In a first step, the centring ring 14 is brought level with the first lateral bead 12b of the tire in order to centre the said bead on the ring. Next, during a second step, the hooks 16 move from the unlocked position into the locked position in order to pinch the first radial bead 12b of the tire axially between the hooks 16 and the ring 14.

During a third step, the centring ring 14 bearing the tire 12 is lowered axially towards the plate 18 so that the internal spacing rollers 22 are situated at a height higher than that of the internal face of the second lateral bead 12c and so that the external holding rollers 24, 26 are situated at a height lower than that of the external face of the bead. During this manoeuvre, the roller 22 of each module 20 is in the deployed axial position with respect to the rollers 14 to 30 of the module. Furthermore, during this manoeuvre, the rollers 22 to 30 of each module 20 are in the radial position of being retracted towards the axis X-X' of the tire so as to allow the internal spacing 22 and centring 28, 30 rollers to pass through the interior space of the tire 12 at the height of the second lateral bead 12c.

During a subsequent fourth step, the collection of frames 36 moves out radially outwards until the centring rollers 28, 30 come into the immediate vicinity of the bore of the second lateral bead 12c of the tire while at the same time remaining distant therefrom. The rollers 28, 30 are moved as far as a predetermined radial dimension less than the seat of the tire 12, for example five millimetres less than the said seat. What is meant by the "seat of the tire" is the interior diameter at which the tire is mounted on the associated rim. At the end of the roller approach phase the internal spacing rollers 22 are situated in the interior space of the tire 12 while being located radially and axially above the internal face of the second lateral bead 12c and the external holding rollers 24, 26 are situated outside of this internal space being located radially and axially below the external face of the bead. During this roller approach phase for rollers 22 to 30, the tire 12 is turned about its axis X-X'.

Next, during a fifth step, the rollers 22 are lowered axially towards the second lateral bead 12c of the tire while the tire is raised slightly in an axial direction through a movement of the centring ring 14 so that the rollers 22 are pressing axially against the internal face of the second bead 12c and axially separating the said bead towards the outside, i.e. axially towards the opposite side from the first bead 12b. In this position, the rollers 24, 26 hold the second bead 12c by axial pressure against the external face thereof. In this position, the rollers 24, 26 press axially only against the internal face of the bead 12c and do not come into radial contact with the bore of the said bead.

During a subsequent sixth step, the frames 36 move even further radially outwards so as to bring the centring rollers 28, 30 radially to bear against the bore of the second lateral bead 12c of the tire. The rollers 28, 30 are deployed radially outwards to a radial dimension that corresponds to the seat of the tire 12.

During a seventh step, the turning of the tire 12 is halted and the internal image capture means are introduced into the tire so as to capture an image of an angular zone of predetermined angle of the internal surface thereof. The internal capture means are preferably introduced via the central passage delimited by the annular plate 18 and are positioned in such a way as to inspect a portion of the interior space of the tire 12 which portion is situated between the plane of symmetry of the tire and the second lateral bead 12c and is completely clear of the presence of the rollers 22 to 30. During this step, the external image capture means are also positioned on the outside of the tire 12 with a view to capturing an image of an angular zone of the external surface thereof, which zone is preferably situated between the plane of symmetry of the tire and the second bead 12c.

Next, during an eighth step, the tire 12 is turned so that it rotates through 360° about its axis X-X' so that the image capture means which are fixed acquire all of the images that allow the image of the first half of the interior surface of the tire 12 situated between the plane of symmetry of the tire and the second lateral bead 12c and of the corresponding exterior surface to be formed.

Finally, during the ninth and final step, the turning of the tire 12 is halted, the internal and external image capture means are removed, the rollers 22 are raised axially then the frames 36 are brought back radially inwards into the retracted position so that the tire 12 can then be removed.

The tire 12 can then be turned over so that the sequence of operations as described hereinabove can be repeated in order to acquire the image of the second half of the interior surface and of the exterior surface of the tire. This then yields a complete image of the tire 12 when the first and second images obtained are juxtaposed.

When the tire 12 is turned about its axis X-X', the bead associated with the holding and centring modules 20 rolls over the rollers 22 to 30 being gripped axially and held radially on the inside by the said rollers. The rollers 22 allow the bead to be separated axially by pressing against the interior side and the rollers 24, 26 provide axial abutment and retention of the bead on the outside. The rollers 28, 30 centre and radially hold the bead. The side wall and the associated bead are thus held axially and radially in a manner that is stable, precise and repeatable during the rotational drive performed via the other bead of the tire. The bead associated with the holding and centring modules 20 is kept in a stable position that is closed in the deflated state and separated axially a little making it possible simultaneously to capture the image of the inside and of the outside of the tire 12.

In the exemplary embodiment illustrated, each holding and centring module comprises a single spacing roller 22, two holding rollers 24, 26 in the spreaded position and two centring rollers 28, 30. It is also possible, without departing from the scope of the invention, to provide a different number of rollers for each of these roller types and/or a different relative arrangement.

In the exemplary embodiment illustrated, the device comprises a plurality of holding and centring modules for the second lateral bead of the tire. The number of holding and centring modules is connected with the number of image capture means that it is intended to use. As an alternative, it is possible to use a single module when just one image capture means is intended, so as to obtain good centring of the bead of the tire in the angular zone of the tire that is being inspected.

The device 10 as illustrated in the figures, which allows the tire 12 to be held axially, centred radially and turned circumferentially is arranged with an orientation with a vertical axis and locking of the upper bead of the tire and holding and centring of the lower bead. As an alternative, it may be possible to conceive of the opposite axial arrangement. In another alternative form, it is also possible to use the device in an orientation in which the axis is horizontal or in which the axis is oblique.

The invention claimed is:

1. An inspection device for holding and turning a tire having a tread and first and second lateral beads, the device comprising:
    a centering device structured to enable the first lateral bead of the tire to be centered;
    a locking device structured to lock the first lateral bead in a centered position;
    a rotation driver arranged to turn the tire about an axis of the tire; and
    at least one centering gripper module arranged to interact with the second lateral bead of the tire, each centering gripper module including:
        an internal spacing roller arranged to be able to press axially against an internal face of the second lateral bead,
        at least one external holding roller arranged to be able to bear axially against an external face of the second lateral bead opposite the internal face, and
        at least one centering roller arranged to be able to bear radially against the second lateral bead,
    wherein each centering roller extends along an axis oriented axially, parallel to the axis of the tire, and
    wherein the internal spacing roller and each external holding roller each extend along an axis oriented radially, perpendicular to the axis of the tire.

2. The device according to claim 1, wherein each centering gripper module includes at least two centering rollers.

3. The device according to claim 2, wherein the at least two centering rollers are arranged circumferentially with at least one being arranged on each side of the internal spacing roller.

4. The device according to claim 1, wherein each centering roller is arranged to be able to bear radially against a bore of the second lateral bead.

5. The device according to claim 1, wherein each centering roller is cylindrical.

6. The device according to claim 1, wherein the internal spacing roller is axially moveable with respect to the at least one external holding roller and the at least one centering roller.

7. The device according to claim 6, wherein each centering gripper module includes:
    a mounting base on which the at least one external holding roller and the at least one centering roller are mounted, and
    a rod slidably mounted on the base and arranged to support the internal spacing roller.

8. The device according to claim 1, wherein each centering gripper module includes at least two external holding rollers.

9. The device according to claim 8, wherein the at least two external holding rollers are arranged circumferentially with at least one being arranged on each side of the internal spacing roller.

10. The device according to claim 8, wherein the internal spacing roller is arranged in a middle portion of an angular sector delimited by the at least two external holding rollers.

11. The device according to claim 1, wherein, in each centering gripper module, the internal spacing roller is the only internal spacing roller.

12. The device according to claim 1, further comprising a fixed plate on which each centering gripper module is mounted with radial translational mobility.

13. The device according to claim 1, wherein the at least one centering gripper module corresponds to a plurality of mutually identical centering gripper modules arranged to interact with the second lateral bead.

14. The device according to claim 13, wherein the plurality of centering gripper modules are spaced apart from each other uniformly in a circumferential direction.

15. A method for inspecting a tire using an inspection device for holding and turning a tire that has a tread and first and second lateral beads, wherein the inspection device includes: a centering device, a locking device, a rotation driver, and at least one centering gripper module, wherein each centering gripper module includes: an internal spacing roller, at least one external holding roller, and at least one centering roller, wherein each centering roller extends along an axis oriented axially, parallel to the axis of the tire, and wherein the internal spacing roller and each external holding roller each extend along an axis oriented radially, perpendicular to the axis of the tire, the method comprising:

centering the first lateral bead of the tire on the centering device;

locking the tire on the centering device using the locking device to lock the first lateral bead in a centered position;

for each centering gripper module, positioning the internal spacing roller relative to the tire by causing a relative axial movement between the tire and the internal spacing roller, such that the internal spacing roller presses against an internal face of the second lateral bead, and such that the internal spacing roller is positioned axially at a different height from a height of the internal face of the second lateral bead while being situated in an interior space of the tire;

deploying each centering gripper module radially to bring the at least one centering roller to a dimension smaller than a seat of the tire;

actuating the rotation driver to turn the tire;

for each centering gripper module, causing a relative axial movement between the tire and the internal spacing roller in order to pinch the second lateral bead axially between the internal spacing roller and the at least one external holding rollers;

deploying each centering gripper module radially to bring the at least one centering roller radially to bear against the second lateral bead at a dimension corresponding to the seat of the tire, and capturing internal and external images of angular regions of internal and external surfaces of the tire using an image capturing device.

* * * * *